UNITED STATES PATENT OFFICE.

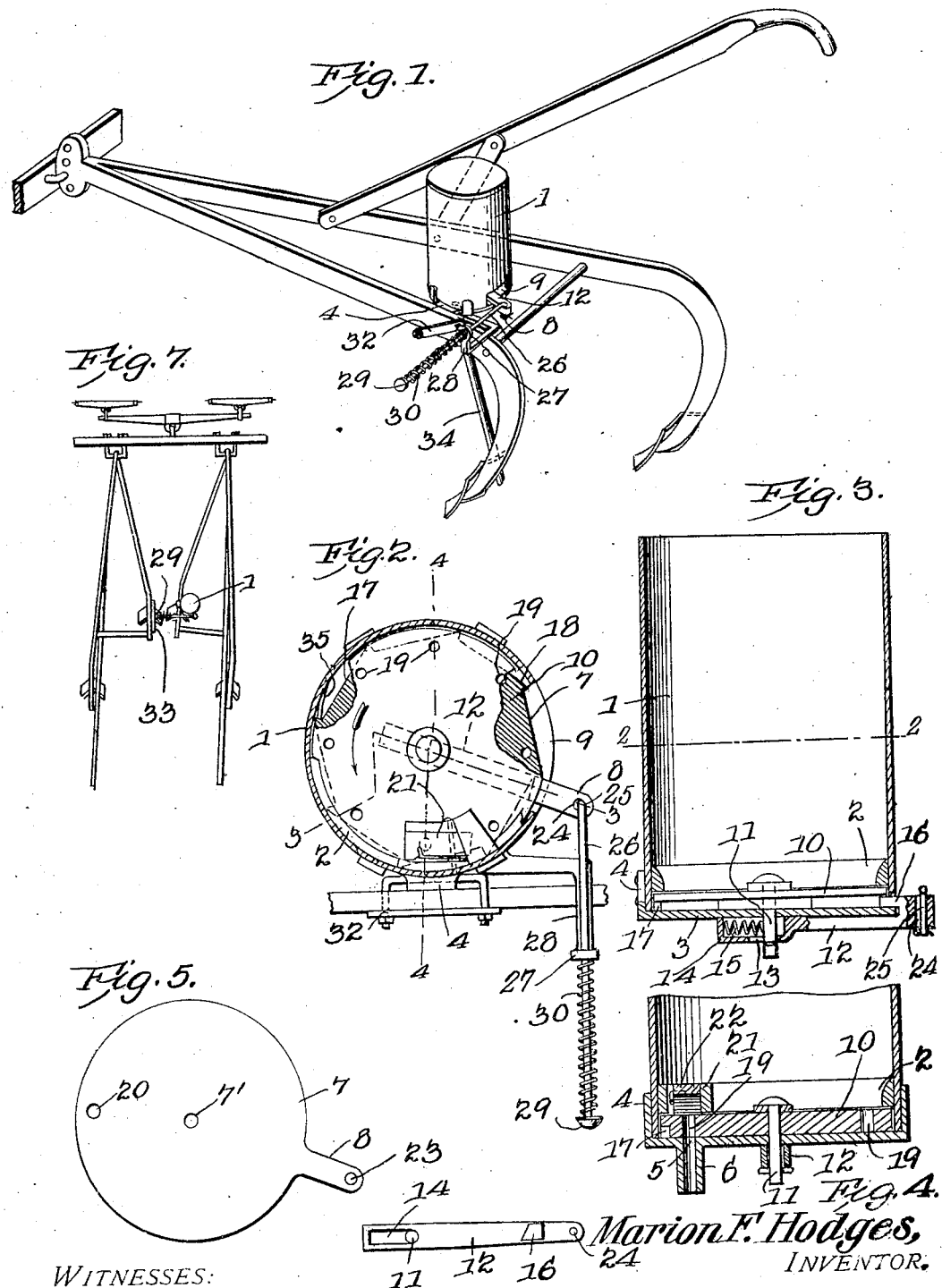

MARION F. HODGES, OF RUSHVILLE, ILLINOIS.

REPLANTING ATTACHMENT FOR CULTIVATORS.

No. 851,750.

Specification of Letters Patent.

Patented April 30, 1907.

Application filed April 18, 1906. Serial No. 312,446.

*To all whom it may concern:*

Be it known that I, MARION F. HODGES, a citizen of the United States, residing at Rushville, in the county of Schuyler and State of Illinois, have invented a new and useful Replanting Attachment for Cultivators, of which the following is a specification.

This invention relates to replanting devices; and it has for its object to provide a replanting device which may be readily applied to and used in connection with an ordinary cultivator for the purpose of depositing discharges of seed in lost hills.

A further object of the invention is to simplify and improve the construction and operation of this class of devices.

With these and other ends in view, which will readily appear as the nature of the invention is better understood, the same consists in the improved construction and novel arrangement and combination of parts, which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be made, when desired.

In the drawings, Figure 1 is a perspective view showing the right hand gang of a cultivator to which the improved replanting device has been applied. Fig. 2 is a horizontal sectional view of the hopper taken on the plane indicated by the line 2—2 in Fig. 3. Fig. 3 is a vertical sectional view of the hopper taken on the plane indicated by the broken line 3—3 in Fig. 2. Fig. 4 is a sectional detail view of the hopper taken on the plane indicated by the line 4—4 in Fig. 2. Fig. 5 is a detail plan view of an oscillatory seed dropping plate, which may be substituted for the rotary seed plate. Fig. 6 is a detail top plan view of the pawl whereby the rotary seed plate is operated. Fig. 7 is a diagram of a cultivator illustrating the operation of the device.

Corresponding parts in the several figures are indicated throughout by similar characters of reference.

The hopper 1 of the improved replanting device is preferably constructed of sheet metal and is provided near its lower edge with an annular reinforcing ring or frame 2 which is connected with a bottom or supporting plate 3; the latter being provided with a bracket, as 4, and with a seed port 5 surrounded by a downward extending nipple 6. The bottom plate 3 supports the rotary seed plate 10 with which it is assembled by means of an axial pivotal bolt or pin 11 which also carries an operating pawl 12 extending through a slot 9 in the side wall of the hopper, and the function of which is to impart rotary movement to the seed disk, as will be presently described. The pawl 12 engages the axial pin 11 by a slot 13, whereby said pawl may have a limited radial or sliding movement; and in the upper side of the pawl is formed a recess 14 in which is placed a spring 15 bearing against the pin 11. The pawl 12 is provided near its outer end with a hook 16 extending around the outer edge of the bottom plate 3 and engages the teeth or ratchets 18 formed at the periphery of the rotary plate or disk 10; the hook 16 being forced in an inward or ratchet engaging direction by the tension of the spring 14. The seed disk 10 has at its upper edge, above the teeth or ratchets 18, an annular flange 17 that interiorly engages the cylindrical seed box or hopper, and prevents seeds from escaping between the teeth or ratchets, or through the slot 9. It is obvious that by rocking or oscillating the pawl member 12 upon the axial pin 11, the seed disk may be advanced or rotated step by step to the extent of the length of the teeth 18. A seed cup or aperture 19 is formed in the seed plate 10 in alinement with each of the teeth 18.

Suitably formed upon the rim or frame 2 is a housing 21 provided with a hinged, spring actuated lid 22 constituting a cut-off.

The outer end of the pawl member 12, which extends through the slot 9, is provided with a perforation, as 24, for the reception of the hooked end 25 of a plunger rod 26 which is guided through an eye 27 of a bracket 28 connected with the bottom plate, and is provided at its outer extremity with a button 29 between which and the eye 27 there is placed a coiled spring 30 whereby the plunger rod is forced in what may be described as an outward or forward direction, holding the pawl 12 in engagement with one edge of the slot 9. When the operating mechanism is actuated, by forcing the plunger 26 in the direction of the arrow in Fig. 2, the contents of a seed cup 19 will be carried into alinement with the seed port 5 and be discharged through the latter, the rotary seed disk being advanced one step, as will be readily understood.

The improved seed dropping device herein described is adapted to be connected for operation with one of the gangs of an ordinary cultivator; the bracket 4 being connected with the inner cultivator beam, as by means of a clip 32. In Fig. 1 of the drawings, the device has been illustrated as being mounted upon the right hand gang of a cultivator, but it is obvious that a left hand device may be constructed for mounting upon a left hand cultivator gang, if preferred. When, during the operation of cultivating a row of corn, a lost hill is encountered, the operator, by swinging the gang that carries the replanting attachment in the direction of the row, will cause the button at the extremity of the plunger rod 26 to encounter a bumper plate, as 33, secured upon the opposite gang, as will be seen in Fig. 7, thus actuating the plunger and the seed dropping mechanism, and causing a charge of seed to pass through the aperture 5, from whence it is conveyed to the furrow opened by the blade attached to the inner cultivator beam with which the dropping attachment is connected, through a tube 34 connected with the nipple 6; the seed being covered by the blade connected with the outer cultivator beam. The operation, it will be seen, may be effected very rapidly, causing a charge of seed to be deposited in the desired spot with certainty and accuracy.

A spring 35 constituting a check pawl is suitably arranged to prevent the reverse rotation of the seed disk 10 by engaging the teeth or ratchets of said disk.

When desired, there may be substituted for the rotary seed disk 10, which has been hereinbefore described, an oscillatory seed disk, as shown at 7 in Fig. 5 of the drawings; said disk being provided with a single aperture constituting a seed cup 20 and with a central perforation 7' whereby it may be pivotally mounted upon the assembling pin or bolt 11. When this oscillatory seed disk is used, it is obvious that the pawl 12 engaging the teeth or ratchets of the rotary seed disk, is also dispensed with; and to afford a connection for the operating rod or plunger rod 26, the said oscillatory disk 7 is provided with an arm 8 adapted to extend through the slot 9 in the wall of the hopper or seed box; said arm 8 being provided with an aperture 23 whereby it may be connected with the hooked end of said plunger rod. When the disk 7 is oscillated by the action of the plunger, the contents of the seed cup 20 will be carried beneath the cut-off to the exit port 5.

From the foregoing description, taken in connection with the drawings hereto annexed, the operation and advantages of this invention will be readily understood by those skilled in the art to which it appertains. The construction is simple and inexpensive, and the improved device is thoroughly efficient for the purposes for which it is provided. The improved replanting device may be attached for operation to riding, as well as to walking, cultivators of ordinary construction; it may also be mounted operatively upon one of the limbs of a hand planter, in which event the extremity of the plunger 26 will be flexibly connected with the other limb of such hand planter, as will be readily understood.

Having thus described the invention, what is claimed is:—

1. In a device of the class described, a hopper having a bottom plate and provided with a seed port, a rotary seed plate having seed cups or apertures, a pivot pin piercing the bottom plate and seed plate, respectively, peripheral teeth or ratchets formed in the seed plate and registering with the apertures, a radially movable spring actuated pawl mounted on the pivot pin and having a hooked extremity extending around the edge of the bottom plate and engaging the ratchets of the seed plate through a slot in the wall of the hopper, a spring interposed between the pivot pin and the adjacent end of the pawl, and a spring actuated plunger connected with the pawl and adapted to actuate said pawl and the seed plate.

2. In a device of the class described, a seed plate supported for rotation and having peripheral teeth or ratchets, a pivotal pin for said plate, a pawl member provided with a terminal upwardly and inwardly extending hook for engagement with the ratchet-teeth and having a slot engaging said pin and a recess, a spring in said recess bearing against the axial pin and tending to force the pawl member in a tooth engaging direction, means for oscillating the pawl member and a spring engaging the teeth on said plate for preventing backward rotation of the latter.

3. In a device of the class described, the combination with a bottom plate constituting a supporting member, of a rotary seed plate having peripheral teeth and an overhanging flange, an oscillatory and radially movable pawl having a terminal inwardly projecting hook embracing the edge of the bottom plate and engaging the teeth of the seed plate, a bracket secured to the bottom plate and provided with an eye, and a spring actuating plunger operatively connected with the pawl and passing through said eye.

4. A hopper, a reinforcing ring for said hopper having a housing provided with a hinged spring-actuated cut-off, a bottom plate having a seed port provided with a nipple, a rotary seed plate having seed cups and teeth or ratchets registering therewith, an oscillatory and radially movable pawl member having a hooked extremity engaging the teeth or ratchets of the seed plate, a pivotal pin assembling the pawl member and the seed plate with the bottom plate.

In testimony that I claim the foregoing as my own, I have hereto affixed my signature in the presence of two witnesses.

MARION F. HODGES.

Witnesses:
H. M. BATES,
H. T. PEMBERTON.